(12) United States Patent
Powell et al.

(10) Patent No.: US 11,182,752 B2
(45) Date of Patent: Nov. 23, 2021

(54) GENERATING TRANSACTION MESSAGE

(75) Inventors: Steven Powell, Hampshire (GB); Jose Emir Garza, Surrey (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1826 days.

(21) Appl. No.: 12/432,329

(22) Filed: Apr. 29, 2009

(65) Prior Publication Data

US 2010/0281490 A1   Nov. 4, 2010

(51) Int. Cl.
*G06Q 20/00* (2012.01)
*G06Q 20/10* (2012.01)

(52) U.S. Cl.
CPC .............. *G06Q 20/00* (2013.01); *G06Q 20/10* (2013.01)

(58) Field of Classification Search
USPC .......................................... 709/201, 203–205
See application file for complete search history.

(56) References Cited

U.S. PATENT DOCUMENTS

| | | | | |
|---|---|---|---|---|
| 5,933,816 A | * | 8/1999 | Zeanah et al. .................. 705/35 |
| 6,006,229 A | * | 12/1999 | Schmidt et al. ......... 707/999.01 |
| 6,115,711 A | * | 9/2000 | White .................... 707/999.104 |
| 6,122,625 A | * | 9/2000 | Rosen ............................. 705/65 |
| 6,185,545 B1 | * | 2/2001 | Resnick et al. ................. 705/40 |
| 6,507,875 B1 | | 1/2003 | Mellen-Garnett et al. |
| 7,206,805 B1 | * | 4/2007 | McLaughlin, Jr. ........... 709/203 |
| 7,225,156 B2 | * | 5/2007 | Fisher et al. .................... 705/50 |
| 2007/0058562 A1 | * | 3/2007 | Scobbie ............. H04L 43/0852  370/252 |
| 2008/0288956 A1 | * | 11/2008 | Videlov .............. G06F 17/3089  719/313 |
| 2010/0069053 A1 | * | 3/2010 | Chen ...................... G06F 9/466  455/418 |

* cited by examiner

*Primary Examiner* — Minh Chau Nguyen
(74) *Attorney, Agent, or Firm* — Cuenot, Forsythe & Kim, LLC

(57) ABSTRACT

Systems methods and computer programs are disclosed that enable generating transaction messages. In one embodiment, the method comprises: generating a transaction message using a first computing device, the transaction message comprising: compensation information comprising instructions indicating a transaction to be executed in order to undo a previously executed transaction; and a transaction identification that identifies an executing program within the first computing device to execute the transaction; and sending the transaction message over an input/output device connected to the first computing device for processing on a second computing device.

15 Claims, 4 Drawing Sheets

GENERATING TRANSACTION MESSAGE

BACKGROUND

The disclosure relates generally to sending and receiving transaction messages, and more particularly, to generating transaction messages including compensation information and a transaction identification.

BRIEF SUMMARY

The subject matter disclosed herein relates to generating transaction messages. In one embodiment, the method comprises: generating a transaction message using a first computing device, the transaction message comprising: compensation information comprising instructions indicating a transaction to be executed in order to undo a previously executed transaction; and a transaction identification that identifies an executing program within the first computing device to execute the transaction; and sending the transaction message over an input/output device connected to the first computing device for processing on a second computing device.

A first aspect of the disclosure provides a method comprising: generating a transaction message using a first computing device, the transaction message comprising: compensation information comprising instructions indicating a transaction to be executed in order to undo a previously executed transaction; and a transaction identification that identifies an executing program within the first computing device to execute the transaction; and sending the transaction message over an input/output device connected to the first computing device for processing on a second computing device.

A second aspect of the disclosure provides a first computing device comprising: a transaction generator for generating a transaction message, the transaction message comprising: compensation information comprising instructions indicating a transaction to be executed in order to undo a previously executed transaction; and a transaction identification that identifies an executing program within the first computing device to execute the transaction; and a sender for sending the transaction message.

A third aspect of the disclosure provides a computer program product comprising a computer readable storage medium having computer readable program code embodied therewith, the computer readable program code comprising: computer-readable program code configured to generate a transaction message, the transaction message comprising: compensation information comprising instructions indicating a transaction to be executed in order to undo a previously executed transaction; and a transaction identification that identifies an executing program to execute the transaction; and computer-readable program code configured to send the transaction message.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
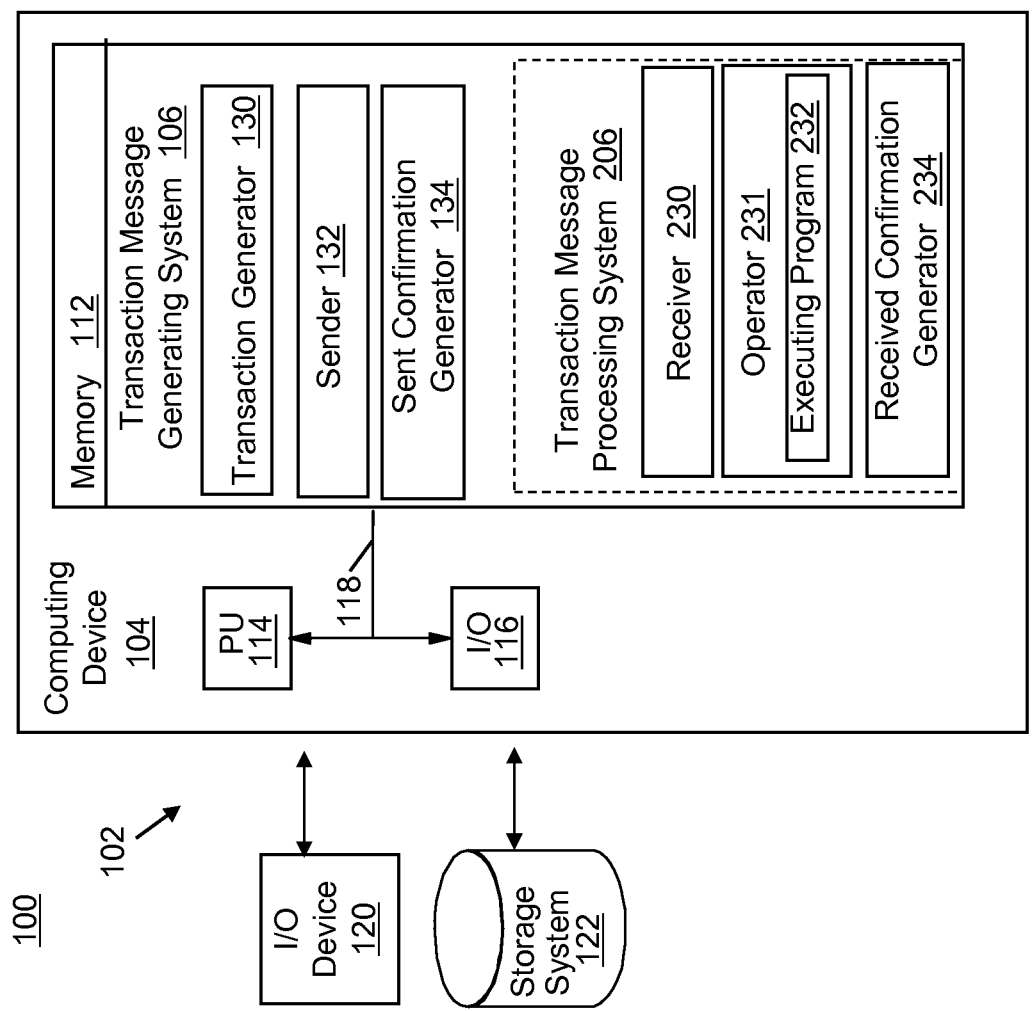
FIG. 1 shows a block diagram of embodiments of a system according to the disclosure.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electromagnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

As indicated above, aspects of the invention provide for generating transaction messages. As used herein, unless otherwise noted, the term "set" means one or more (i.e., at least one) and the phrase "any solution" means any now known or later developed solution.

As is known in the art of data processing, transactions may be used to separate tasks such as the modifying of multiple data items with common reference data. Where tasks include common reference data, and one task is only partially complete, other related tasks may read the partially complete task as inconsistent or invalid. Transactions may be used to solve this problem of inconsistent or invalid communications between tasks. Transactions may remain invisible to tasks or other transactions until all operations within the transaction are executed or backed out. This reduces some of the problems associated with partially complete tasks. Therefore, transactions may be useful in a variety of data processing applications. One such application is in the financial sector. While examples related to financial transactions (within a financial process) may be used to describe aspects of the invention, these are in no way limiting. The transaction messages and generating thereof described herein may apply to a variety of sectors not explicitly described.

In dataflow and/or process flow systems, a financial process may be implemented as a sequence of transactions, each of which may succeed or fail by committing or backing out, respectively. For example, transferring money between several bank accounts may require a plurality of transactions. Most simply, transferring money between two accounts may require debiting a first account and crediting a second account. A simple, yet illustrative example of "transferring $100 from account X to account Y" will be used to demonstrate aspects of the invention. Transferring $100 from account X to account Y may include debiting $100 from account X and crediting $100 to account Y. The transaction of debiting account X may trigger the transaction of crediting account Y. However, many transactions may be related to each of those transactions in a sequence. For instance, crediting $100 to account Y may place the account balance of account Y over a certain threshold balance. This threshold balance may trigger a transaction of debiting account Y, which subsequently triggers a transaction of crediting another account, "account Z." Each transaction in the sequence may be triggered by the preceding transaction through transmission of a message initiating the subsequent transaction. However, if one of the transactions in the sequence fails, then one or more of the preceding transactions may require compensating (backing out), as those preceding transactions may no longer be relevant or required. In the banking example, above, if crediting $100 to account Y fails, then the transaction of debiting account X may need to be compensated.

The process of compensating may be more complex than simply "un-doing" a transaction. Compensating may require providing compensation information that compensates (commits or backs-out) a particular transaction, as well as a transaction identification that identifies which transaction is to be compensated. While prior attempts to compensate transactions have relied upon external stores such as databases or queues for storage and retrieval of compensation information, the present invention uses a transaction message including compensation information and a transaction identification.

Turning to the drawings, FIG. 1 shows an illustrative environment 100 for generating a transaction message. To this extent, environment 100 includes a computer infrastructure 102 that can perform the various process steps described herein for generating a transaction message. In particular, computer infrastructure 102 is shown including a computing device 104 that includes a transaction message generating system 106, and optionally, a transaction message processing system 206, both of which enable computing device 104 to perform the processes of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as transaction message generating system 106, that is stored in memory 112 and/or storage system 122. While executing computer program code, processor 114 can read and/or write data to/from memory 112, storage system 122, and/or I/O interface 116. Bus 118 provides a communications link between each of the components in computing device 104. I/O device 120 can include any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can include any general purpose computing article of manufacture capable of executing computer program code installed by a user (e.g., a personal computer, server, handheld device, etc.). However, it is understood that computing device 104 and transaction message generating system 106 are only representative of various possible equivalent computing devices that may perform the various process steps of the disclosure. To this extent, in other embodiments, computing device 104 can include any specific purpose computing article of manufacture including hardware and/or computer program code for performing specific functions, any computing article of manufacture that includes a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 includes two or more computing devices (e.g., a server cluster) that communicate over any type of wired and/or wireless communications link, such as a network, a shared memory, or the like, to perform the various process steps of the disclosure. When the communications link includes a network, the network can include any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Further, transaction message generating system 106 can be implemented using a set of modules (e.g., transaction generator 130, sender 132, etc.). In this case, a module can enable computing device 104 to perform a set of tasks used by transaction message generating system 106, and can be separately developed and/or implemented apart from other portions of transaction message generating system 106. As used herein, the term "component" means any configuration of hardware, with or without software, which implements and/or enables a computing device 104 to implement the functionality described in conjunction therewith using any solution, while the term "module" means program code that enables a computing device 104 to implement the functionality described in conjunction therewith using any solution. When embodied in a tangible medium of expression, a module is a component. Regardless, it is understood that two or more components, modules, and/or systems may share some/all of their respective hardware and/or software. Further, it is understood that some of the functionality discussed herein may not be implemented or additional functionality may be included as part of computing device 104.

Figure 2:
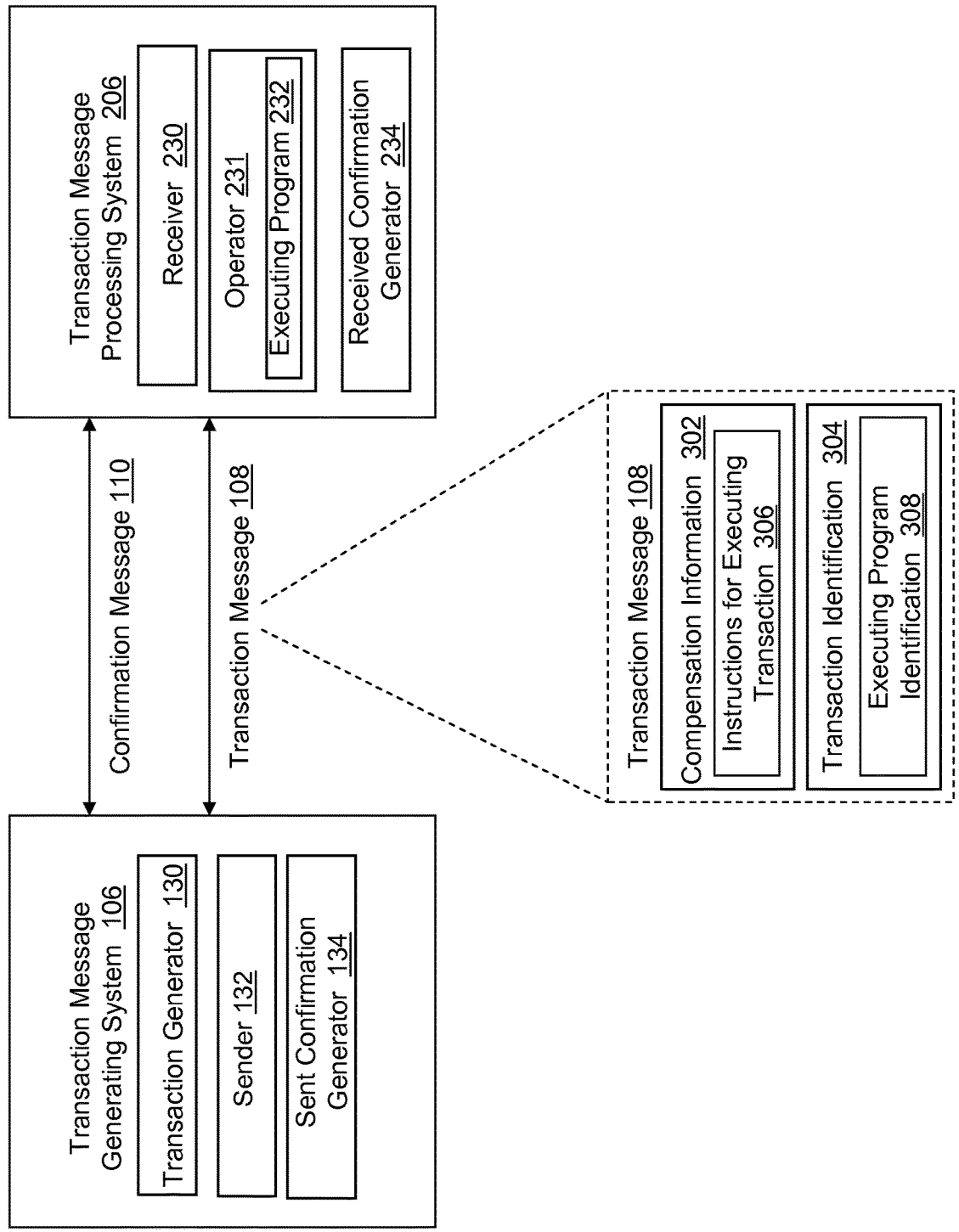
FIG. 2 shows a data flow diagram of embodiments of systems according to the disclosure.

Turning to FIG. 2, and with continuing reference to FIG. 1, a data flow diagram depicting generation, sending and processing of a transaction message 108 is shown. Transaction message 108 may be generated by transaction generator 130, contained within transaction message generating system 106. Also included within transaction message generating system 106 may be a sender 132 and a sent confirmation generator 134 (optional, shown in phantom). As shown in the expanded view of transaction message 108 (shown in phantom), transaction message 108 may include compensation information 302 and a transaction identification 304. Compensation information 302 may include instructions for executing transaction 306. Further, transaction identification 304 may include an executing program identification 308 that identifies an executing program 232 within a transaction message processing system 206 to execute the transaction. Transaction message processing system 206 may include a receiver 230, operator 231 and a received confirmation generator 234 (optional, shown in phantom). Operator 231 may include executing program 232. Transaction message generating system 106 and transaction message processing system 206 may send or receive a confirmation message 110 to or from a different system. Further, transaction message generating system 106 and transaction message processing system 206 may send one or more confirmation messages 110 between each other. Transaction message processing system 206 may be partially or wholly contained within computing device 104, or may be partially or wholly contained in one or more different computerized systems.

Figure 3:
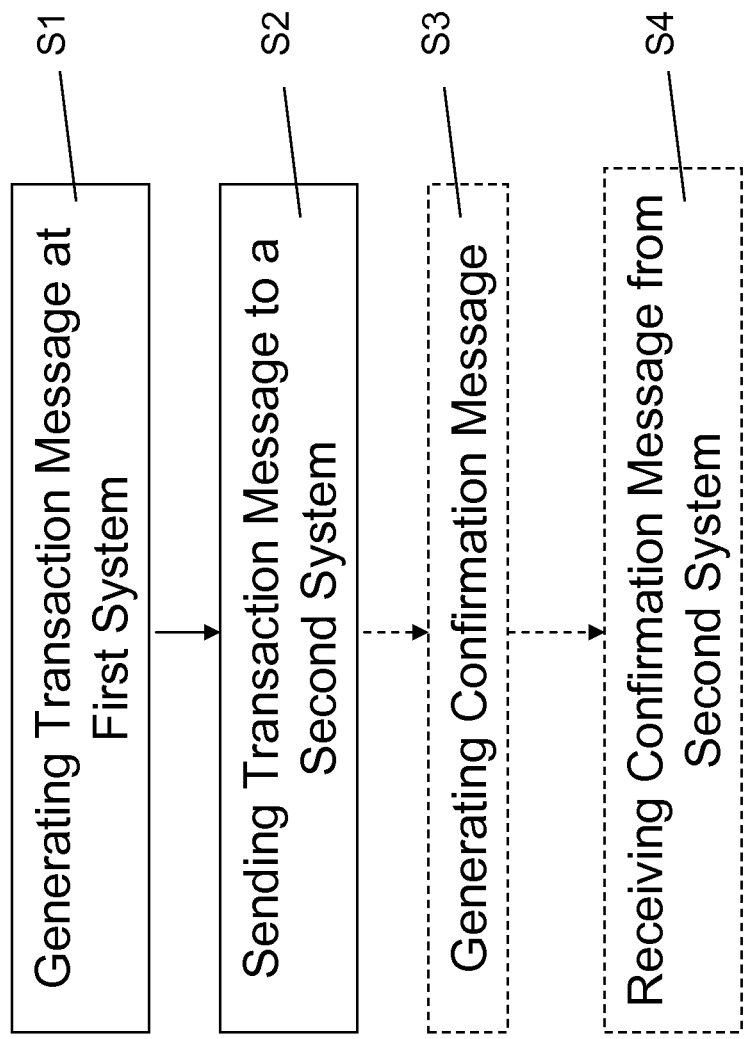
FIG. 3 shows a flow diagram of embodiments of generating a transaction message using the system of FIG. 1.

In FIG. 3, a flow diagram of embodiments of generating a transaction message is shown. In step S1, transaction generator 130 may generate a transaction message 108 at a transaction message generating system 106 (FIGS. 1-2). Transaction generator 130 may generate transaction message 108, including compensation information 302 and transaction identification 304. Using the aforementioned example of "transferring $100 from account X to account Y", compensation information 302 may include instructions for executing transaction 306. Instructions for executing transaction 306 may include commands for compensating the "debit $100 from account X" transaction where the "credit $100 to account Y" transaction has failed. In this case, instructions for executing transaction 306 may include a command to increase the account balance of account X by $100. Further, transaction identification 304 may include executing program identification 308. In this case, executing program identification 308 may indicate which executing program 232 is to perform the task of "crediting $100 to account X."

Figure 4:
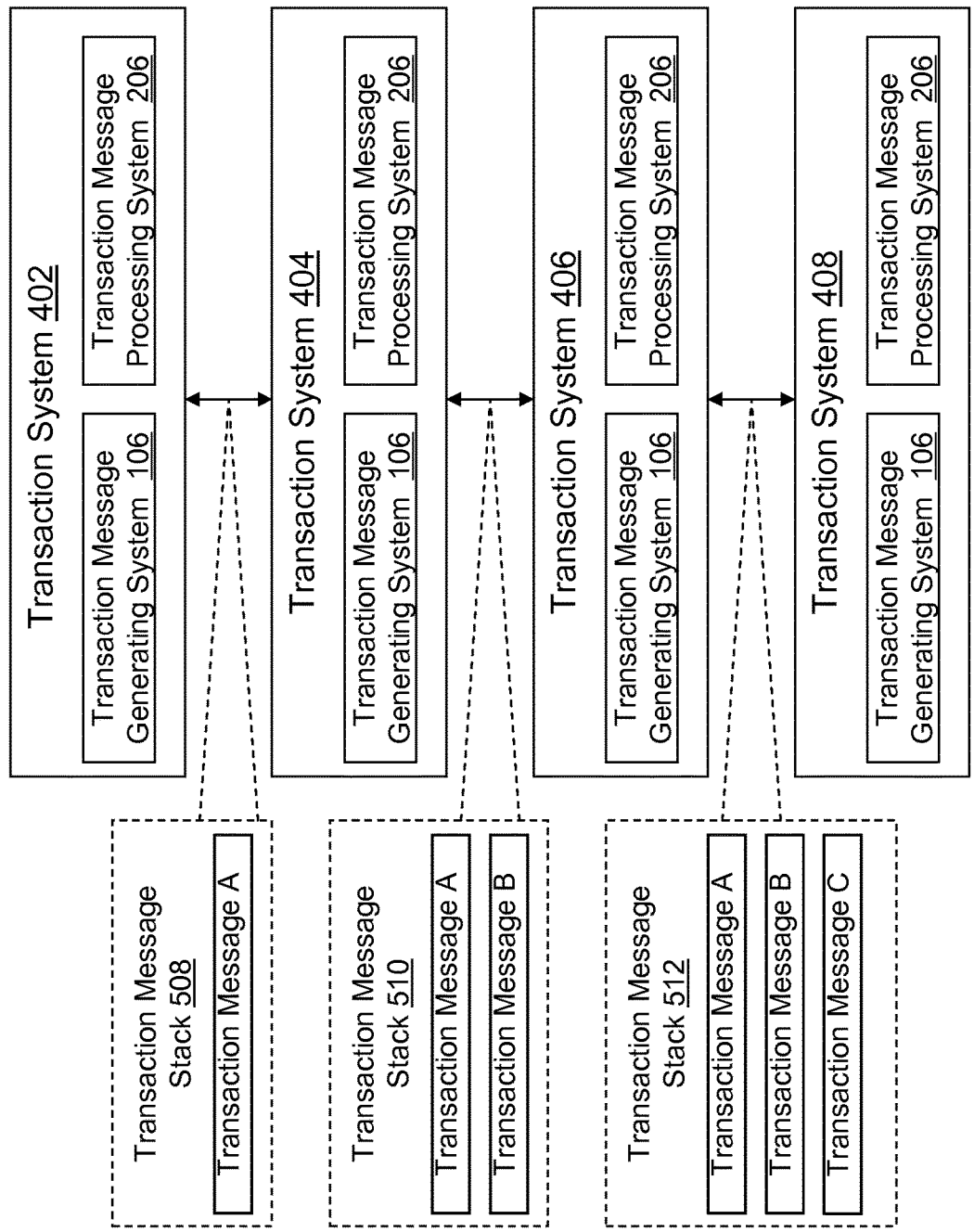
FIG. 4 shows a data flow diagram of embodiments of systems according to the disclosure.

In step S2, transaction message 108 may be sent to a second system, which may be a transaction message processing system 206 (FIG. 2), or a distinct transaction system (FIG. 4). Further, transaction message 108 may be sent between transaction message generating system 106 and transaction message processing system 206, or may be sent between transaction systems (FIG. 4). Details of generating and sending transaction message 108 are further described with reference to examples contained herein and FIG. 4.

In optional step S3, sent confirmation generator 134 generates a confirmation message 110 (FIG. 2). Transaction message generating system 106 may include a sent confirmation generator 134 for confirming that transaction message 108 has been sent to transaction message processing system 206 or another transaction system. Sent confirmation generator 134 may indicate that transaction message 108 has been sent via, for example, a visual, auditory, or other sensory indicator. For example, sent confirmation generator 134 may display or print a receipt or detailed accounting of a specific transaction message 108 or may print or display multiple confirmation messages 110 for multiple transaction messages 108. Further, sent confirmation generator 134 may confirm that transaction message 108 has been sent through any conventional means.

Referring still to FIG. 3, optional step S4 is shown, whereby transaction message generating system 106 may receive confirmation message 110 from a second system. The second system may be, for example, transaction message processing system 206. In this case, after sending of transaction message 108 by sender 132, receiver 230 may receive transaction message 108. Subsequently, received confirmation generator 234 may generate a confirmation message 110 that transaction message 108 was received by transaction message processing system 206. Received confirmation generator 234 may indicate that transaction message has been received via, for example, a visual, auditory, or other sensory indicator. Received confirmation generator 234 may display or print a receipt or detailed accounting of a specific transaction message 108 or may print or display multiple confirmation messages 110 for multiple transaction messages 108. In any event, received confirmation generator 234 may confirm that transaction message 108 has been received through any conventional means. Further, received confirmation generator 234 may send a confirmation message 110 back to transaction message generating system 106, indicating that transaction message 108 has been received.

As will be described herein, transaction systems may contain a message generating system 106 and/or a message processing system 206. The functions of transaction message generating system 106 and message processing system 206 are further described herein with respect to specific examples.

In one embodiment, transaction message 108 may increase the efficiency of sequential transactions. For example, as shown in FIG. 4, a sequential transaction "D" may be part of a series of transactions "A", "B", "C" and "D", all executed at transaction systems 402, 404, 406 and 408, respectively. Transaction systems 402, 404, 406 and 408 may each contain a transaction message generating system 106 and/or a transaction message processing system

206. Transaction systems 402-408 may generate and/or process transaction messages 108, and may be part of a sequence of transaction systems. Further, transaction systems 402-408 are merely illustrative, as a greater or fewer number of transaction systems may send transaction messages 108 between each other.

Referring to FIG. 4, an example of a sequential transaction according to one embodiment of the invention is shown. As used in FIG. 4, and this accompanying description, "transaction messages" A-D may represent distinct transaction messages 108, each attributable to transactions A-D, respectively. Therefore, "transaction message A" represents the transaction message 108 including compensation information 302 and transaction identification 304 for transaction A. The same applies to transaction messages B, C & D, respectively. Where transactions A through C have succeeded, but transaction D has failed, transactions A, B, and/or C may need to be compensated (undone). Where transaction C may need to be compensated, a message calling for compensation of transaction C may ideally be sent from transaction system 404. However, the action which caused compensation of transaction C is the failure of transaction D (at transaction system 408). In this case, compensation of transaction C may be accomplished by including compensation information 302 within transaction message C sent from transaction system 406 to transaction system 408. Compensation information 302 may include instructions for executing transaction 306 (FIG. 2). Instructions for executing transaction 306 may include specific commands for compensating transactions. For example, in transaction message 108 sent from transaction system 406 to transaction system 408, compensation information 302 may include instructions for compensating transaction C. In this case, where transaction D fails, transaction system 408 may send a transaction message 108 back to transaction system 406 for compensation of transaction C. Transaction message 108 sent from transaction system 408 to transaction system 406 may include the compensation information 302 originally sent from transaction system 406 to transaction system 408. Compensation information 302 may allow for the compensation (undoing) of transaction C through instructions for executing transaction 306. Instructions for executing transaction 306 may include commands for performing a function.

Using the aforementioned example, transaction C and transaction D may both be part of a larger transaction such as, "transfer $100 from account X to account Y." The transfer of $100 may require a minimum of two transactions: 1) debit $100 from account X (transaction C); and 2) credit $100 into account Y (transaction D). In the above general example, we assume that transaction D may fail. In this case, account Y will not accept a credit of $100. This may happen, for example, if an account number on the deposit (account X) does not match a number on a pre-screened list of acceptable account numbers. However, there are many reasons for which transaction D may fail. In any event, where transaction D fails, and the $100 is not credited into account Y, transaction C may need to be compensated (returning $100 to account X). In order to compensate transaction C, the original transaction message 108 (transaction message C) sent from transaction system 406 to transaction system 408 may be sent back to transaction system 406. Transaction message C may include compensation information 302, having instructions for executing transaction 306. In this case, instructions for executing transaction 306 may provide instructions for depositing (returning) $100 into account X.

Further included in transaction message C is transaction identification 304. Transaction identification 304 may use executing program identification 308 to identify executing program 232 within transaction message processing system 206 (of transaction system 406). In the above general example, transaction system 406 may send, in transaction message C to transaction system 408, transaction identification 304 for identifying which executing program 232 in transaction system 406 is to perform the compensation transaction. Transaction identification 304 may include an executing program identification 308 which directs an executing program 232 to compensate (undo), for example, transaction C. Transaction identification 304 may identify which transaction executed at transaction system 406 requires compensation. In the example of the $100 transfer, transaction identification 304 may identify the original transaction at transaction system 406 that requires compensation. In this case, the transaction of, "debit $100 from account X" may require compensation. Transaction identification 304 may identify the specific transaction to be compensated, while executing program identification 308 may identify which executing program 232 within transaction system 406 will perform the compensation. Both transaction identification 304 and compensation information 302 may be included in the same transaction message 108 sent between transaction system 406 and transaction system 408.

FIG. 4 further shows an alternative embodiment in which transaction message stacks 508, 510, 512 (shown in phantom) may be sent between transaction message systems 402, 404, 406 and 408. In this case, transaction messages (A, B, C, etc.) sent between transaction systems 402, 404, 406 and 408 may be sent as a group in transaction message stacks 508, 510, 512. Transaction message stacks 508, 510, 512 allow for compensation of transactions A, B, C in sequence. For example, after successful execution of transaction A at transaction system 402, transaction message A may be sent in transaction message stack 508 to transaction system 404. Following successful execution of transaction B, both transaction message A and transaction message B may be sent in transaction message stack 510 to transaction system 406. After successful execution of transaction C at transaction system 406, all of transaction messages A, B and C may be sent in transaction message stack 512 to transaction system 408. If, as in the above-referenced examples, transaction D fails at transaction system 408, then transactions A, B and/or C may need to be compensated. Using transaction message stacks 508, 510, 512, compensation information 302 and transaction identification 304 for each of transactions A, B, and C may be sent back to transaction systems 402, 404 and/or 406. This may provide for compensation of previous transactions in a sequence.

While the example transaction of, "transfer $100 from account X to account Y" is used herein, many other transactions may be executed using the invention. For example, transaction message 108 may be part of a larger transaction scheme such as a sweep accounting scheme. As is known in the art of financial transactions, a sweep account may be used to transfer money from a primary cash (i.e., business checking) account into an investment account. Sweep accounts may be used to work around the prohibition on paying interest on business checking accounts. In this case, funds are "swept" (transferred) overnight into an investment account where the funds can accrue interest. Transferring funds to and from a sweep account may involve multiple transactions and corresponding transaction messages 108. Further examples of applications of transaction messages 108 include setting price floors or ceilings on stock sales or purchases. A transaction message 108 may be generated, for example, when a stock price hits a certain predetermined level. In this case, transaction message 108 may be tied to the transaction of, "buy 100 shares of stock X at price Y." This transaction may be triggered by a predetermined setting, which indicates when stock X reaches price Y. Even further, transaction message 108 may be used in tracking and maintaining an average minimum account balance in an interest bearing or other account. While specific examples of financial transactions are described herein, it will be apparent to one skilled in the art that transaction message 108 may be used in a variety of financial transactions not expressly described.

Various other forms of transactions may be executed using transaction message 108. For example, transaction message 108 may be used in a real estate transaction, where a first party may purchase a property from a second party. Sale of the property may, for example, be contingent upon a transaction involving another property. Even further, a series of transactions involving real property may utilize transaction message 108. In one case, financing for a condominium project may be contingent upon a developer obtaining a finite number of signed contracts assigned to each condominium parcel. Transactions between the developer, potential condominium owners, and financiers may all be linked in a series of transactions, each associated with a transaction message 108. Further examples using transaction message 108 may include transferring quantities of personal property between two or more parties, and transferring quantities of goods between two or more parties. As used herein, the term "party" may, but does not necessarily, refer to a distinct person, company or entity. Examples involving transactions between two or more "parties" may include transactions made between one party and itself.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method, comprising:
  receiving, by a third computing device and from a second computing device, a third transaction message indicating:
    a third transaction to be performed on the third computing device and
    compensation information for the third transaction; and
  sending, by the third computing device to the second computing device and upon the third transaction failing at the third computing device, a fourth transaction message, wherein the third transaction has failed at the third computing device, the compensation information identifies:
- a fourth transaction to be executed, on the second computing device, to undo a previously-executed second transaction on the second computing device, and
- a fifth transaction to be executed, on a first computing device, to undo a previously-executed first transaction on the first computing device, and the fourth transaction message includes the compensation information.

2. The method of claim 1, wherein
the compensation information includes
- a second transaction identification that identifies a second executing program within the second computing device to execute the fourth transaction, and
- a first transaction identification that identifies a first executing program within the first computing device to execute the fifth transaction.

3. The method of claim 1, wherein
the compensation information received by the third computing device includes:
- compensation information received by the second computing device from the first computing device, and
- compensation information generated by the second computing device.

4. The method of claim 1, wherein
the third transaction is part of a sequence of transactions, and
the sequence is the first transaction followed by the second transaction followed by the third transaction.

5. The method of claim 1, wherein
the third transaction message is a stack of transaction messages including transaction messages separately generated by the second computing device and the first computing device.

6. A third computing device, comprising
at least one hardware processor configured to initiate the following operations:
- receiving, from a second computing device, a third transaction message indicating a third transaction to be performed on the third computing device and compensation information for the third transaction; and
- sending, to the second computing device and upon the third transaction failing at the third computing device, a fourth transaction message, wherein the third transaction has failed at the third computing device,
the compensation information identifies:
- a fourth transaction to be executed, on the second computing device, to undo a previously-executed second transaction on the second computing device, and
- a fifth transaction to be executed, on a first computing device, to undo a previously-executed first transaction on the first computing device, and the fourth transaction message includes the compensation information.

7. The device of claim 6, wherein
the compensation information includes
- a second transaction identification that identifies a second executing program within the second computing device to execute the fourth transaction, and
- a first transaction identification that identifies a first executing program within the first computing device to execute the fifth transaction.

8. The device of claim 6, wherein
the compensation information received by the third computing device includes:
- compensation information received by the second computing device from the first computing device, and
- compensation information generated by the second computing device.

9. The device of claim 6, wherein
the third transaction is part of a sequence of transactions, and
the sequence is the first transaction followed by the second transaction followed by the third transaction.

10. The device of claim 6, wherein
the third transaction message is a stack of transaction messages including transaction messages separately generated by the second computing device and the first computing device.

11. A computer program product, comprising:
a hardware storage device having stored therein computer readable program code,
the computer readable program code, when executed by a third computer device, causes the third computing device to perform:
- receiving, from a second computing device, a third transaction message indicating a third transaction to be performed on the third computing device and compensation information for the third transaction; and
- sending, to the second computing device and upon the third transaction failing at the third computing device, a fourth transaction message, wherein the third transaction has failed at the third computing device,
the compensation information identifies:
- a fourth transaction to be executed, on the second computing device, to undo a previously-executed second transaction on the second computing device, and
- a fifth transaction to be executed, on a first computing device, to undo a previously-executed first transaction on the first computing device, and the fourth transaction message includes the compensation information.

12. The computer program product of claim 11, wherein
the compensation information includes
- a second transaction identification that identifies a second executing program within the second computing device to execute the fourth transaction, and
- a first transaction identification that identifies a first executing program within the first computing device to execute the fifth transaction.

13. The computer program product of claim 11, wherein
the compensation information received by the third computing device includes:
- compensation information received by the second computing device from the first computing device, and
- compensation information generated by the second computing device.

14. The computer program product of claim 11, wherein
the third transaction is part of a sequence of transactions, and
the sequence is the first transaction followed by the second transaction followed by the third transaction.

15. The computer program product of claim 11, wherein the third transaction message is a stack of transaction messages including transaction messages separately generated by the second computing device and the first computing device.

* * * * *